(12) United States Patent
Meisel et al.

(10) Patent No.: US 8,088,830 B2
(45) Date of Patent: Jan. 3, 2012

(54) PAPER PRODUCTION WITH MODIFIED SILICA GELS AS MICROPARTICLES

(75) Inventors: Karlheinrich Meisel, Odenthal (DE); Bernd Thiele, Bensheim (DE); Gerd-Friedrich Renner, Kurten (DE); Johan Kijlstra, Odenthal (DE); Arno Nennemann, Bergisch Gladbach (DE); Thomas Hubbe, Cologne (DE); Lothar Puppe, Burscheid (DE)

(73) Assignees: Kemira Oyj (FI); Akzo Nobel Chemicals International B.V. (NL)

( * ) Notice: Subject to any disclaimer, the term of this patent is extended or adjusted under 35 U.S.C. 154(b) by 0 days.

(21) Appl. No.: 12/685,947

(22) Filed: Jan. 12, 2010

(65) Prior Publication Data

US 2010/0108277 A1    May 6, 2010

Related U.S. Application Data

(63) Continuation of application No. 10/561,620, filed as application No. PCT/EP2004/07081 on Jun. 30, 2004, now Pat. No. 7,708,862.

(30) Foreign Application Priority Data

Jul. 4, 2003 (DE) .................................. 103 30 395
Apr. 24, 2004 (DE) .......................... 10 2004 020 112

(51) Int. Cl.
*C01B 33/141* (2006.01)
*C09K 3/00* (2006.01)

(52) U.S. Cl. .............................. 516/81; 516/77; 162/158

(58) Field of Classification Search .................... 516/81, 516/77; 162/158
See application file for complete search history.

(56) References Cited

U.S. PATENT DOCUMENTS

| | | | |
|---|---|---|---|
| 2,244,324 A | 6/1941 | Bender | |
| 4,798,653 A * | 1/1989 | Rushmere | ................... 162/168.3 |
| 5,368,833 A | 11/1994 | Johansson et al. | |
| 5,603,805 A | 2/1997 | Andersson et al. | |
| 5,643,414 A | 7/1997 | Johansson et al. | |
| 5,760,126 A * | 6/1998 | Engle et al. | ................... 524/516 |
| 5,888,290 A * | 3/1999 | Engle et al. | ............. 106/287.12 |
| 2002/0011191 A1 * | 1/2002 | Greenwood et al. | .......... 106/737 |
| 2003/0054948 A1 * | 3/2003 | Pinnavaia et al. | ............. 502/158 |

FOREIGN PATENT DOCUMENTS

| | | |
|---|---|---|
| DE | 2426306 A1 | 4/1975 |
| DE | 10050343 A1 | 6/2001 |
| EP | 0063471 B1 | 3/1986 |
| EP | 0185068 B1 | 9/1989 |
| EP | 0635602 B1 | 1/1995 |
| EP | 1142640 A1 | 10/2001 |
| WO | 8600100 A1 | 1/1986 |
| WO | 0069976 A1 | 11/2000 |
| WO | 2005003455 A1 | 1/2005 |

OTHER PUBLICATIONS

S. Brunauer, et al., "Adsorption of Gases in Multimolecular Layers," J. Amer. Soc., (1938), 60, 309-319.
Sears, "Determination of Specific Surface Area of Colloidal Silica by Titration with Sodium Hydroxide," Analytical Chem., (1956), 28, 12, 1981-1983.
Iler, et al., "Degree of Hydration of Particles of Colloidal Silica in Aqueous Solution," Journal of Physical Chemistry, (1956), 60, 955.
Iler, "Sols of Silica Particles with Modified Surfaces," The Chemistry of Silica, Wiley & Sons, New York, (1979), 407-410.
Badley, et al., "Silica-Bound Sulfonic Acid Catalysts," J. Org. Chem., (1989), 54, 5437-5443.

* cited by examiner

*Primary Examiner* — Ling Choi
*Assistant Examiner* — Chun-Cheng Wang
(74) *Attorney, Agent, or Firm* — Cantor Colburn LLP

(57) ABSTRACT

Use of silica sols containing sulfonic acid groups and/or mercapto groups as microparticles in paper production, in particular for paper retention.

13 Claims, No Drawings

PAPER PRODUCTION WITH MODIFIED SILICA GELS AS MICROPARTICLES

CROSS REFERENCE TO RELATED APPLICATIONS

The present application is a continuation application of U.S. patent application Ser. No. 10/561,620 filed on Mar. 6, 2007, now U.S. Pat. No. 7,708,862, which is a U.S. National Stage of Application No. PCT/EP04/07081, filed on Jun. 30, 2004, the disclosures of which are also incorporated herein by reference. Priority under 35 U.S.C. §119(a) and 35 U.S.C. §365(b) is claimed from German Application No. 10-2004-020-112.9 filed on Apr. 24, 2004 and German Application No. 103-30-95.2 filed on Jul. 4, 2003, the disclosures of which are also incorporated herein by reference.

The invention relates to the use of modified silica sols for paper production, modified silica sols as such and processes for their preparation.

In the production of paper, microparticle systems are used for improving retention, drainage behavior and formation (this is understood as meaning the "uniformity" or "cloudiness" of the paper). These may be both of an organic or an inorganic nature. They are preferably used in combination with cationic polymers.

Preferably used inorganic microparticles are bentonites and silica sols (cf. EP-A-0 635 602).

In contrast to the organic microparticle systems which display their full effect even in an acidic medium, inorganic microparticle systems based on bentonite or silica sol have the disadvantage that they achieve their optimum effect only in a neutral alkaline medium.

Silica sols moreover have the disadvantage that they tend to gel on prolonged storage. This in turn necessitates further additives, such as dispersants or surface doping with aluminum ions (EP-A-0185 068, U.S. Pat. No. 5,603,805, K. K. Iler, The Chemistry of Silica, Wiley & Sons, New York, 1979, pages 407-410).

As a further disadvantage, the known silica sols for the purpose of the microparticle system have a cost/effect relationship which is in need of improvement.

It was an object of the present invention to provide silica sols as microparticles for paper production which do not have the described disadvantages of the prior art.

Surprisingly, it has now been found that silica sols containing sulfonic acid groups and/or mercapto groups achieve this object.

The invention therefore relates to the use of silica sols containing sulfonic acid groups and/or mercapto groups as microparticles in paper production, in particular for paper retention.

In the context of this application, "acid group" is also understood as meaning salts thereof, in particular alkali metal salts, such as sodium and potassium salts, alkaline earth metal salts, such as magnesium salts and calcium salts, or ammonium salts.

Preferred silica sols are those which have, bonded to a silicon atom, a group of the formula (I) and/or II

in which
B is a (p+1)-valent bridge member,
p is a number from 1 to 3 and
M is hydrogen, an alkali metal, in particular Na, Li or K, an alkaline earth metal, in particular Mg or Ca, or ammonium.

B is particularly preferably bivalent, i.e. p is 1. B is preferably a linear or branched alkylene group optionally interrupted by one or more oxygen atoms and having 1 to 15 C atoms, a cycloalkylene group having 5 to 8 C atoms or a unit of the formulae

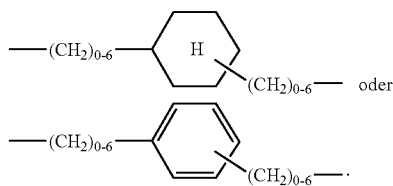

B is very particularly preferably —$(CH_2)_n$— where n is 1 to 6, in particular 3.

Silica sols having sulfonic acid groups, in particular those of the formula (I), particularly preferably those of the formula (Ia)

are preferably used, M having the abovementioned meaning.

The sulfur content, based on $SiO_2$ of the silica sol, is preferably from 0.1 to 30 mol %, preferably from 0.1 to 8 mol %, in particular from 1 to 5 mol %. The sulfur content may be determined, for example, by elemental analysis.

According to the TEM (Transmission Electron Microscopy) method, the silica sols used according to the invention preferably have a mean particle size of less than 400 nm, preferably of 2-200 nm, in particular of 2-45 nm, particularly preferably of 2-20 nm.

The silica sols according to the invention preferably have a specific surface area of from 300 to 1200 m²/g, preferably from 400 to 1200 m²/g, in particular from 450 to 1200 m²/g, measured by Sears titration with sodium hydroxide.

The specific surface area is determined by titrating the silica sol with NaOH according to the Sears method (G. W. Sears, Analytical Chem. 28, 12, page 1981 et seq., 1956). The specific surface area of this calibration sol is determined using the BET method (S. Brunauer, P. H. Emmet and E. Teller, J. Amer. Soc. 60, 309-319, 1938).

Also preferred are the silica sols according to the invention which have an S value from 2 to 80, preferably from 2.5 to 70, in particular from 20 to 70.

The S values are determined according to Iler, R. K.; Dalton, R. L. *Journal of Physical Chemistry* 1956, 60, 955.

The silica sols used according to the invention are preferably present as an aqueous dispersion, preferably having a content of from 5 to 20% by weight of silica sol, based on the dispersion, preferably from 7.5 to 15% by weight, in particular from 10 to 15% by weight. These dispersions, to which the present invention likewise relates, may furthermore contain salts of the alkali metal or alkaline earth metal elements or compounds of aluminum or of boron. Furthermore anionic or nonionic dispersants may be present.

However, the dispersions preferably have an Al content of less than 0.1% by weight. If the salt content is too high, it can be reduced, for example by means of a membrane method. The silica gel contents in the dispersion can also be adjusted by means of membranes, for example by concentration of less concentrated dispersions.

The silica sol according to the invention is preferably used in combination with cationic polymers, in particular those from the group consisting of the polyethylenimines, polyamidoamides, polyacrylamides, polyvinylamine, starch or guar flour which may optionally be further modified and which may be used individually or in any desired mixture with one another.

Linear or branched compounds having a molecular weight greater than 0.5 million g/mol, in particular from 500 000 to 2 million g/mol, preferably from 700 000 to 1.5 million g/mol, may be mentioned as preferred polyethylenimines.

Linear or branched compounds having a molecular weight greater than 0.5 million g/mol, in particular from 500 000 to 2 million g/mol, preferably from 700 000 to 1.5 million g/mol, may be mentioned as preferred polyamidoamines.

Preferred polyacrylamides may be both linear and branched. The molecular weight may be from 2 million to 30 million Dalton, preferably from 2.5 million to 15 million Dalton.

Cationic starches based on potatoes, tapioca, maize, wheat or rice may be mentioned as preferred starch derivatives. They preferably have a degree of substitution of from 0.005 to 0.15, particularly preferably a degree of substitution of from 0.02 to 0.08. The starches may optionally also be partly degraded.

The invention furthermore relates to silica sols containing sulfonic acid groups and/or mercapto groups and having a mean particle size, measured according to TEM, of 2-45 nm, preferably of 2-20 nm. Otherwise, the abovementioned preferred ranges are applicable.

The invention furthermore relates to silica sols containing sulfonic acid groups and/or mercapto groups and having a sulfur content, based on $SiO_2$ of the silica sol, of from 0.1 to 30 mol, preferably from 0.1 to 8 mol %, in particular from 1 to 5 mol %.

Otherwise, the abovementioned preferred ranges are applicable. The silica sols according to the invention which have such a sulfur content are preferred in particular when they have a radical of the formula—$(CH_2)_3$—$SO_3M$, in which M has the above meaning and is in particular H or Na.

Also preferred are those embodiments of silica sols according to the invention which have mercapto groups, in particular which have those of the formula (II) bonded to an Si atom, and which have a content of sulfonic acid groups of less than 1 mol %, based on $SiO_2$ of the silica sol.

The invention furthermore relates to a process for the preparation of the silica sols according to the invention, which is characterized in that a silica sol which is free of SH and $SO_3M$ groups and in which M has the above meaning,
for the optional introduction of the SH groups,
a) is reacted with mercapto compounds and
for the optional introduction of the sulfonic acid groups,
b) is reacted with a compound containing $SO_3M$ groups or
b1) is reacted with a compound containing a functional group and the functional group itself is converted into an $SO_3M$ group, in particular the mercapto compound obtained according to a) is oxidized, or
b2) is reacted with a compound containing a functional group and the silica sol derivatized in this manner is further reacted with a compound containing $SO_3M$ groups,
the reaction being carried out in an aqueous medium having a water content of at least 75% by weight in at least one of the stages a), b), b1) or b2), based on the respective reaction mixture.

The variants a), b) and b1) are particularly preferred.

The compound of the formula III

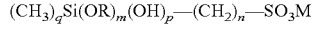
$(CH_3)_q Si(OR)_m(OH)_p$—$(CH_2)_n$—$SO_3M$ (III), in which
m and p are each a number from 0 to 3,
q is 0 the 1 and the sum of q and m and p is 3,
n=1 to 15, preferably 1 to 6, in particular 3,
M has the above meaning and
R is $C_1$-$C_3$-alkyl, in particular methyl or ethyl,
is preferably to be mentioned as a compound containing $SO_3M$ groups.

Compounds of the formula (III) which correspond to the formula (IIIa)

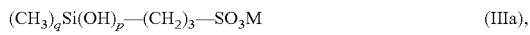
$(CH_3)_q Si(OH)_p$—$(CH_2)_3$—$SO_3M$ (IIIa), in which
M, p and q have the abovementioned meaning, in particular p is 3 and q is 0,
are particularly preferred.

A mercapto (SH) compound which is oxidized after the reaction to give an $SO_3M$ compound is preferably used as a compound containing at least one functional group.

Preferred mercapto compounds which may be mentioned are those of the formula (IV)

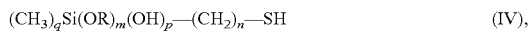
$(CH_3)_q Si(OR)_m(OH)_p$—$(CH_2)_n$—SH (IV), in which
m, p and q have the abovementioned meanings,
n is from 1 to 15, in particular from 1 to 6, preferably 3, and
R has the abovementioned meaning, and is preferably methyl or ethyl.

A preferred compound of the formula IV is that of the formula (IVa)

$(CH_3)_q Si(OCH_3)_m(CH_2)_3$—SH (IVa), in which the sum of q and m is 3,
and a compound of the formula (IVb)

$(CH_3)_q Si(OH)_p(CH_2)_3$—SH (IVb), in which the sum of q and p is 3 and
in which m, p and q each have the abovementioned meaning.

The reaction of silica sol with compounds carrying functional groups, in particular with the mercapto compounds, preferably those of the formulae IV and IVa, is preferably characterized in that the two components are allowed to react at a temperature of from 0° C. to 150° C., preferably from 0° C. to 100° C. Possible condensation products, such as water and alcohols, can preferably be removed continuously from the reaction mixture, for example by distillation. The procedure can optionally also be effected in a solvent.

In particular, the mercapto groups of the silica sol thus obtained can subsequently be oxidized with an oxidizing agent, preferably $H_2O_2$, in a known manner to give sulfonic acid groups.

The oxidation can alternatively also be carried out with ammonium peroxodisulfate, sodium peroxodisulfate, potassium peroxodisulfate, iron nitrate, tert-butyl hydroxyperoxide, oxone (Caro's acid), potassium iodate, potassium periodate or periodic acid.

Compounds which carry functional groups which serve as anchors and are reacted with compounds which in turn carry one or more $SO_3H$ groups may furthermore be mentioned. Such compounds have, for example, the general formula (V)

$(CH_3)_q Si(OH)_m(CH_2)_3$—F, (V)

in which
F is a functional group which can be further reacted, such as, for example, an SH group or a primary or secondary amino group, and q and m have the abovementioned meaning.

Preferred compounds carrying functional groups are:

$Si(OCH_3)_3$—$(CH_2)_3$—SH (VI), $CH_3Si(OCH_3)_2(CH_2)_3—SH$ (VII), $Si(OH)_3—(CH_2)_3—SH$ (VIII), $CH_3Si(OH)_2(CH_2)_3—SH$ (IX), $Si(OC_2H_5)_3—(CH_2)_3—SH$ (X), $CH_3Si(OC_2H_5)_2—(CH_2)_3—SH$ (XI), $Si(OCH_3)_3—(CH_2)_3—NH_2$ (XII), $CH_3Si(OCH_3)_2(CH_2)_3—NH_2$ (XIII), $Si(OH)_3—(CH_2)_3—NH_2$ (XIV), $CH_3Si(OH)_2(CH_2)_3—NH_2$ (XV), $Si(OC_2H_5)_3—(CH_2)_3—NH_2$ (XVI), $CH_3Si(OC_2H_5)_2—(CH_2)_3—NH_2$ (XVII), which in turn can be reacted with bifunctional compounds of the general formula $ClO_2S—B_1—(SO_2Cl)_n$, in which n is 1 or 2
and $B_1$ is an aromatic bridge member having 6 or 10 carbon atoms.

Particularly preferred are benzenedisulfonic acid chlorides, toluenedisulfonic acid chlorides or naphthalenedisulfonic acid chlorides or naphthalenetrislfonic acid chlorides, which in turn can be substituted so that, for example, a microparticle system of the general formula $SiO_2)—(CH_2)_3—NH—SO_2—C_{10}H_6—SO_3M$ (XVIII)

results.

It is also preferable to react components of the general formulae VI to XVII with bi- or trifunctional reagents which in turn carry no further acidic group and are capable of bridge formation. Such compounds are, for example, cyanuric chloride or diisocyanates, in particular hexamethylene diisocyanate, p-phenylene diisocyanate or toluene diisocyanate. They can in turn be reacted with compounds which are substituted by sulfonic acid groups. Such compounds may be: taurine or aromatic sulfonic acids known from dye chemistry and substituted by amino groups, for example H-acid (1-amino-8-hydroxinaphthalene-3,6-disulfonic acid), 1-acid (2-amino-5-hydroxy-naphthalene-7-sulfonic acid) or γ-acid (2-amino-8-hydroxy-6-sulfonic acid).

The compounds III to XVII are preferably used in an amount of from 0.1 to 30 mol %, in particular from 0.5 to 5 mol %, based on Si of the silica sol.

The invention also relates to the products obtainable by reaction of silica sol and a compound of the formula III or IV and optionally subsequent oxidation.

Silica sols containing sulfone groups are already known in a different form (for example different particle size or different sulfur content) for catalyst purposes from EP-A-1 142 640, EP-A-63 471, DE-A-2 426 306 and R-D. Badley, T. Ford. J. Org. Chem. 1989, 54, 5437-5443.

The invention furthermore relates to a process for the production of paper, which is characterized in that the silica sol according to the invention and a cationic polymer are added to an aqueous cellulose dispersion in any desired sequence and then the sheet formation, drainage and drying of the sheet are carried out. Such processes are described, for example, in U.S. Pat. No. 5,643,414.

The silica sols according to the invention are distinguished by a substantially improved shelf-life. At the same time, they exhibit substantially improved efficiency in drainage rate and retention, in particular in combination with cationic polymers of low charge density.

EXAMPLES

Example 1

A concentrated aqueous solution of waterglass having the empirical composition ($Na_2O.3.3SiO_2$) is diluted with water to an $SiO_2$ content of 6%. The aqueous solution is adjusted to pH 2.3 to 2.5 with an acidic ion exchanger. The solution obtained is referred to below as "fresh sol".

Example 2

The fresh sol solution prepared in example 1 is added dropwise to a dilute waterglass solution in 0.5 hour and thermostated in an alkaline medium for about half an hour at a temperature of 72° C. and then for half an hour at a temperature of 76° C. The pH should be between 8 and 10. Evaporation is then effected under a slight vacuum to a solids content of 10%.

Example 3

The procedure is as in example 2, except that 1 mol % of a 10% strength solution of $Si(OR)_3—(CH_2)_3—SH$, where $R=CH_3$, in ethanol is metered in simultaneously with the metering of the fresh sol solution into the alkaline medium. A mixture of methanol and ethanol is distilled off continuously. After the solution has been thermostated analogously to example 2, the mercapto group is oxidized in a known manner to $SO_3H$ by adding 35% strength $H_2O_2$ solution. Evaporation is then effected to a solids content of 10%.

Example 4

$Si(OR)_3—(CH_2)_3—SH$, where $R=C_2H_5$, can also be used in an analogous manner. An identical product forms.

Example 5

The procedure is as in example 2, except that 2.5 mol % of a 10% strength solution of $Si(OR)_3—(CH_2)_3—SH$, where $R=CH_3$, in ethanol is metered in simultaneously with the metering of the fresh sol solution into the alkaline medium. A mixture of methanol and ethanol is distilled off continuously. After the solution has been thermostated analogously to example 2, the mercapto group is oxidized in a known manner to $SO_3H$ by adding 35% strength $H_2O_2$ solution. Evaporation is then effected to a solids content of 10%.

Example 6

$Si(OR)_3—(CH_2)_3—SH$, where $R=C_2H_5$, can also be used in an analogous manner. An identical product forms.

Example 7

The procedure is as in example 2, except that 5 mol % of a 10% strength solution of $Si(OR)_3—(CH_2)_3—SH$, where $R=CH_3$, in ethanol is metered in simultaneously with the metering of the fresh sol solution into the alkaline medium. A mixture of methanol and ethanol is distilled off continuously. After the solution has been thermostated analogously to example 2, the mercapto group is oxidized in a known manner to $SO_3H$ by adding 35% strength $H_2O_2$ solution. Evaporation is then effected to a solids content of 10%.

Example 8

$Si(OR)_3$—$(CH_2)_3$—$SH$, where $R=C_2H_5$, can also be used in an analogous manner. An identical product forms.

Example 9

10 g of an ethanolic solution containing 50% by weight of a silane of the formula $Si(OC_2H_5)_3$—$(CH_2)_3$—$SH$ are added dropwise to 100 ml of water with vigorous stirring at room temperature. The pH is kept above pH 10 by titration with NaOH. After stirring for one hour at room temperature, the ethanol is distilled off.

80 g of an aqueous solution of $Si(OH)_3$—$(CH_2)_3$—$SH$, which may already be aggregated via hydrogen bridges, are obtained.

Example 10

100 g of a solution according to example 9 are oxidized by dropwise addition of hydrogen peroxide. A solution of a silane of the empirical formula $Si(OH)_3$—$(CH_2)_3$—$SO_3Na$, which may already be aggregated via hydrogen bridges, is obtained.

Example 11

The procedure is as in example 3, except that 1 mol % of the hydrolyzed silane from example 9 is metered in instead of the silane containing alkoxy groups. The mercapto group is then oxidized in a known manner to $SO_3H$ by adding 35% strength $H_2O_2$ solution. Evaporation is effected to a solids content of 10%.

Example 12

The procedure is as in example 3, except that 2.5 mol % of the hydrolyzed silane from example 9 are metered in instead of the silane containing alkoxy groups. The mercapto group is then oxidized in a known manner to $SO_3H$ by adding 35% strength $H_2O_2$ solution. Evaporation is effected to a solids content of 10%.

Example 13

The procedure is as in example 3, except that 5 mol % of the hydrolyzed silane from example 9 are metered in instead of the silane containing alkoxy groups. The mercapto group is then oxidized in a known manner to $SO_3H$ by adding 3% strength $H_2O_2$ solution. Evaporation is effected to a solids content of 10%.

Example 14

The procedure is as in example 3, except that 1 mol % of the hydrolyzed silane from example 10 is metered in instead of the silane containing alkoxy groups. The subsequent oxidation from example 3 is omitted. Evaporation is effected to a solids content of 10%.

Example 15

The procedure is as in example 3, except that 2.5 mol % of the hydrolyzed silane from example 10 are metered in instead of the silane containing alkoxy groups. The subsequent oxidation from example 3 is omitted. Evaporation is effected to a solids content of 10%.

Example 16

The procedure is as in example 3, except that 5 mol % of the hydrolyzed silane from example 10 are metered in instead of the silane containing alkoxy groups. The subsequent oxidation from example 3 is omitted. Evaporation is effected to a solids content of 10%.

Example 17

872.8 g of demineralized water is initially introduced and 105.4 g of 50% NaOH are added. The temperature is increased to 40° C. At this temperature, 11.1 g of 97% strength 3-mercaptopropyl-1-trimethoxysilane are added dropwise in 15 minutes.

Stirring is effected for 45 minutes at 40° C., and then 5.3 g of methanol are distilled off in 45 minutes. For the oxidation of the mercapto group, 16 g of 35% strength hydrogen peroxide are then added in 45 minutes. Stirring is effected again for 1 hour at 40° C.

Yield: 1000 g of an alkaline solution of trihydroxysilylpropanesulfonic acid.

Example 18

479.7 g of mineral water are initially introduced, and 135.3 g of 50% NaOH are added. The temperature is increased to 40° C. At this temperature, 133.2 g of 97% strength 3-mercaptopropyl-1-trimethoxysilane are added dropwise in 60 minutes.

Stirring is effected for 60 minutes at 40° C., and then 63.2 g of methanol are distilled off in 90 minutes. For the oxidation of the mercapto group, 191.8 g of 35% strength hydrogen peroxide are then added in 60 minutes. The reaction is highly exothermic and the temperature increases to 60° C. Stirring is effected again for 1 hour at 60° C. 1123.2 g of 50% NaOH are then added.

Yield: 2000 g of an alkaline solution of trihydroxysilylpropanesulfonic acid.

Example 19

91.1 g of an alkaline solution of trihydroxysilylpropanesulfonic acid from example 17 are initially introduced at room temperature. 1000 g of a 6% strength fresh sol solution from example 1 are metered into this solution while mixing as thoroughly as possible. The resulting silica sol is evaporated at a temperature below 60° C. in vacuo to a solids content of 15%.

A silica sol solution having a degree of modification of 0.5% of silane, based on $SiO_2$, is obtained.

Example 20

15.2 g of an alkaline solution of trihydroxysilylpropanesulfonic acid from example 18 are initially introduced at room temperature. 1000 g of a 6% strength fresh sol solution from example 1 are metered into this solution while mixing as thoroughly as possible. The resulting silica sol is evaporated at a temperature below 60° C. in vacuo to a solids content of 15%.

A silica sol solution having a degree of modification of 0.5% of silane, based on $SiO_2$, is obtained.

Example 21

901.3 g of mineral water are initially introduced and 55.0 g of 99% NaOH are added. The temperature is increased to 40° C. At this temperature, 22.2 g of 97% strength 3-mercaptopropyl-1-trimethoxysilane are added dropwise in 15 minutes.

Stirring is effected for about 60 minutes at 40° C. until a clear solution has formed, and then 10.5 g of methanol are distilled off in 45 minutes. For the oxidation of the mercapto group, 32 g of 35% strength hydrogen peroxide are then added in 45 minutes. Stirring is effected again for 1 hour at 40° C.

Yield: 1000 g of an alkaline solution of trihydroxysilylpropanesulfonic acid.

Example 22

91.1 g of an alkaline solution of trihydroxysilylpropanesulfonic acid from example 21 are initially introduced at room temperature. 1000 g of a 6% strength fresh sol solution from example 1 are metered into this solution while mixing as thoroughly as possible. The resulting silica sol is evaporated at a temperature below 60° C. in vacuo to a solids content of 15%.

A silica sol solution having a degree of modification of 1% of silane, based on $SiO_2$, is obtained.

Example 23

811.4 g of mineral water are initially introduced and 62.0 g of 99% NaOH are added. The temperature is increased to 40° C. At this temperature, 55.5 g of 97% strength 3-mercaptopropyl-1-trimethoxysilane are added dropwise in 15 minutes.

Stirring is effected for about 60 minutes at 40° C. until a clear solution has formed, and 26.3 g of methanol are then distilled off in 45 minutes. For the oxidation of the mercapto group, 79.9 g of 35% strength hydrogen peroxide are then added in 45 minutes. Stirring is effected again for 1 hour at 40° C.

Yield: 1000 g of an alkaline solution of trihydroxysilylpropanesulfonic acid.

Example 24

89.2 g of an alkaline solution of trihydroxysilylpropanesulfonic acid from example 23 are initially introduced at room temperature. 1000 g of a 6% strength fresh sol solution from example 1 are metered into this solution while mixing as thoroughly as possible. The resulting silica sol is evaporated at a temperature below 60° C. in vacuo at a solids content of 15%.

A silica sol solution having a degree of modification of 2.5% of silane, based on $SiO_2$, is obtained.

Example 25

424.9 g of mineral water are initially introduced, and 68.5 g of 99% NaOH are added. The temperature is increased to 40° C. At this temperature, 222 g of 97% strength 3-mercaptopropyl-1-trimethoxysilane are added dropwise in 60 minutes.

Stirring is effected for about 60 minutes at 40° C. until a clear solution has formed, and the resulting methanol is then distilled off in 90 minutes. For the oxidation of the mercapto group, 319.6 g of 35% strength hydrogen peroxide are then added in 60 minutes. The reaction is highly exothermic and the temperature increases to 60° C. Stirring is effected again for 1 hour at 60° C. Thereafter, 85.6 g of 99% NaOH are added. An initial precipitate goes into solution again.

Yield: 1000 g of an alkaline solution of trihydroxysilylpropanesulfonic acid.

Example 26

49.5 g of an alkaline solution of trihydroxysilylpropanesulfonic acid from example 25 are initially introduced at room temperature. 1000 g of a 6% strength fresh sol solution from example 1 are metered into this solution while mixing as thoroughly as possible. The resulting silica sol is evaporated at a temperature below 60° C. in vacuo at a solids content of 15%.

A silica sol solution having a degree of modification of 5% of silane, based on $SiO_2$, is obtained.

Example 27

99 g of an alkaline solution of trihydroxysilylpropanesulfonic acid from example 26 are initially introduced at room temperature. 1000 g of a 6% strength fresh sol solution from example 1 are metered into this solution while mixing as thoroughly as possible. The resulting silica sol is evaporated at a temperature below 60° C. in vacuo to a solids content of 15%.

A silica sol solution having a degree of modification of 10% of silane, based on $SiO_2$, is obtained.

Example 28

An apparatus which consists of three glass overflow reactors arranged in series and connected to one another was used. The content of the overflow reactors, measured at the boiling point, is 783 ml for reaction vessel 1, 617 ml for reaction vessel 2 and 644 ml for reaction vessel 3.

The content in each reaction vessel is thoroughly mixed by means of a propeller stirrer. The reactor content is heated indirectly with steam. For this purpose, heating coils through which steam flows are mounted in the interior of the reaction vessels. The vapors are passed via a water cooler and condensed, and the volume of the condensate is then measured.

An aqueous solution of acidic fresh sol was introduced into the first of the three overflow reactors by means of a feed apparatus, said aqueous solution having been prepared according to U.S. Pat. No. 2,244,325. The feed apparatus was chosen so that the addition could also be effected into individual, selected reactors. The addition of the silane solution and optionally a solution of a further base was likewise possible via a metering apparatus.

In order to increase the shelf-life, i.e. the duration of storability of the fresh sol, said solution was cooled to temperatures of 4-10° C.

The silane solution was not cooled but was used at the ambient temperature.

In the three reaction vessels, a steady state with an average residence time of 14 min in the 1st reaction vessel, 16 min in the 2nd reaction vessel and 20 min in the 3rd reaction vessel was established. For this purpose, 3200 ml of fresh sol which was prepared analogously to example 1 were introduced with 5.6% by weight of $SiO_2$ per hour into the first reaction vessel and 260 ml of a 2.25% strength by weight ethanolic solution of trimethoxysilylpropylmercaptan per hour were likewise introduced into the 1st reaction vessel, and 1160 ml of water/methanol were evaporated.

During the steady state, 91° C. was established in the 1st reaction vessel, 100° C. in the 2nd reaction vessel and likewise 100° C. in the 3rd reaction vessel. The $SiO_2$ concentration changes from 5.6% by weight in the 1st reaction vessel to 9.5% by weight in the 3rd reaction vessel during the steady state.

After cooling of the product, an excess of 20% of a 3% strength solution of $H_2O_2$ is added.

A finely divided, partly structured silica sol which had a density of 1.065 g/ml, a pH of 9.7, a BET surface area of 480 $m^2/g$ and an $SO_3H$ content of 1 mol % was obtained.

Example 29

In the apparatus described in example 28, a steady state with an average residence time of 14 min in the 1st reaction vessel, 16 min in the 2nd reaction vessel and 20 min in the 3rd reaction vessel was established by introducing 1600 ml of fresh sol with 5.6% by weight of $SiO_2$ per hour into the first reaction vessel and 128 ml of a 2.25% strength by weight ethanolic solution of trimethoxysilylpropylmercaptan per hour likewise into the 1st reaction vessel and by evaporating 390 ml of water/ethanol in the 3rd reaction vessel.

During the steady state, 87° C. was established in the 1st reaction vessel, 100° C. in the 2nd reaction vessel and likewise 100° C. in the 3rd reaction vessel. The $SiO_2$ concentration changed from 5.6% by weight in the 1st reaction vessel to 6.1% by weight in the 2nd reaction vessel.

After a run time of 3 hours in the steady state, a silica sol with 6.1% of $SiO_2$, having a pH of 8.71 and a BET surface area of 698 $m^2/g$, was obtained.

After cooling of the product, an excess of 20% of a 3% strength solution of $H_2O_2$ was added.

Example 30

The efficiency of the compounds from examples 2, 3, 5, 7, 11, 12, 13, 14, 15, 16, 19, 20, 22, 24, 26 and 27 was determined in a known manner by determining the drainage rates in a Mütek DFS 03 apparatus, wire 60/0.17.

The unmodified silica sol from example 2 served as a standard. Its efficiency was set at 100%.

Carrying Out the Drainage Test

In order to achieve optimum differentiation and comparability between the individual test series, an automated metering and stirring profile is maintained. An apparatus from Mütek (DFS 03) (Dynamic Filtration System) is used for the test. With this apparatus, it is possible, inter alia, to specify stirring profiles as a function of time and to shear the initially introduced stock at up to 1500 rpm.

A mixture of long and short fibers with addition of 20% of filler was used as a model system for the tests (58.35% of bleached short-fiber and 25% of bleached long-fiber pulp, 16.65% of precipitated calcium carbonate GCC). The preferred consistency is 0.5%. As a reference system, a polyacrylamide having a cationicity of 20% and a Brookfield viscosity of 3.91, measured in 0.1% strength 1 molar NaCl at 60 rpm, was combined with the microparticles. In order to measure the drainage (and the retention) with the DFS-03, the polyacrylamide is used in a concentration of 0.075% by weight and the microparticles in a concentration of 0.08% by weight, based in each case on the stock.

In order to measure the drainage with the DFS-03, the stock is initially introduced with stirring (500 rpm) and a solution of the polyacrylamide, which was prepared as described below, is metered in after 10 s. After 20 s, shearing is effected for a further 20 s at 1200 rpm and the microparticles are then added. After a mixing phase (200 rpm, 10 s) and a further shearing phase (500 rpm, 10 s), the valve below the wire (mesh size: 0.25 mm) is opened and the drainage time is measured. The drainage time of the zero sample was about 60 s.

Weights Taken:

0.4 g of the polyacrylamide is sprinkled with stirring into 99.6 g of water (tap water), stirring is effected for 15 minutes (magnetic stirrer, 300 rpm) and the mixture is then left to stand for ½ hour for swelling (switch off stirrer).

It is then made up to 400 g (0.1% strength solution) and stirred at 500 rpm for about 2.5 hours until everything has completely dissolved.

The following increases in efficiency resulted:

TABLE

| Silica sol from ex. | Sulfur content in mol %, based on $SiO_2$ of the silica sol | Increase in the drainage rate in % | Particle sizes [nm] | S-value ** | Surface area * [$m^2/g$] |
|---|---|---|---|---|---|
| 2 | 0 | 100 | 3-35 | 64 | 545 |
| 3 | 1 | 103 | 5-40 | 67 | 574 |
| 5 | 2.5 | 115 | 3-40 | 60 | 515 |
| 7 | 5 | 140 | 5-40 | 48 | 469 |
| 11 | 1 | 103 | 5-40 | 62 | 520 |
| 12 | 2.5 | 110 | 3-40 | 59 | 580 |
| 13 | 5 | 152 | 5-40 | 50 | 414 |
| 14 | 1 | 104 | 3-40 | 65 | 530 |
| 15 | 2.5 | 114 | 3-40 | 63 | 545 |
| 16 | 5 | 158 | 5-40 | 47 | 570 |
| 19 | 0.5 | 120 | 2-7 | 24.2 | 835 |
| 20 | 0.5 | 125 | 2-7 | 25.0 | 854 |
| 22 | 1 | 124 | 2-7 | 32 | 854 |
| 24 | 2.5 | 120 | 2-7 | 35.3 | 622 |
| 26 | 5 | 130 | 2-7 | 32.5 | 874 |
| 27 | 10 | 140 | 2-7 | 41 | 867 |

* For this purpose, 350 ml of an NaCl solution (0.286 kg/l) and 2 ml of 1 M HCl are added to a defined amount of silica sol (5 g of solid, based on $SiO_2$) and the silica sol is made up to 500 ml with demineralized water. The dilute silica sol has a pH of about 2 and an NaCl concentration of 4.9 M/l). 150 ml of the dilute silica sol are titrated at a defined temperature with a 0.1 MNaOH solution. The consumption V (ml) between pH = 4 and an end pH (EP) of about 9 is determined. The specific surface area $O_{sp}$ in $m^2/g$ is obtained using the formula: $O_{sp} = 23 \cdot V - 25$. The end pH of the titration EP is determined using a calibration sol for which the specific surface area and hence theoretical NaOH consumption $V_t$ are known. In the sample preparation for the BET measurement, the calibration sol is diluted to about 5% with demineralized water and adjusted to pH <5 with an ion exchanger. Thereafter, the ion exchanger is filtered off and the filtrate is adjusted to exactly pH = 5 with sodium hydroxide solution. The sample was completely frozen and thawed in three freezing cycles at <-10° C. in each case in order subsequently to be dried at 110° C.
** The relative viscosity is determined by means of an Ostwald viscometer, and the relative volume fraction of the dispersed phase is calculated therefrom. According to Iller et al. the S-value is obtained therefrom with a knowledge of the solids concentration. The S-value indicates the proportion of silica in the dispersed phase, in percent by weight. Sample preparation: shortly before the measurement of the viscosity, the alkaline samples are adjusted to pH 2. For this purpose, the samples are poured over a fresh ion exchanger in order simultaneously to exchange sodium ions for protons. Thereafter, filtration is effected and the pH is adjusted to 2 with 1 N HCl. The silica concentration is determined gravimetrically.

The invention claimed is:

1. A silica sol containing sulfonic acid groups and having a mean particle size, measured according to TEM, of 2-45 nm, wherein the silica sols are those, which have bonded to a silicon atom, of formula (I):

—B—$(SO_3M)_p$—,  Formula (I)

wherein p is 1; M is hydrogen, an alkali metal, an alkaline earth metal, or ammonium B is a linear or a branched alkylene group optionally interrupted by one or more oxygen atoms and having 1 to 15C atoms or a cycloalkylene group having 5 to 8C atoms or a unit of formulae:

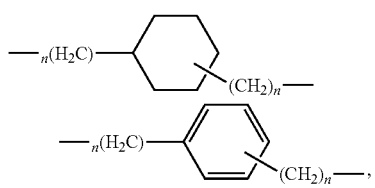

wherein n is 0 to 6.

2. A process for the preparation of the silica sols according to claim 1, characterized in that a silica sol which is free of SO$_3$M groups and in which M has the above meaning,
   a) is reacted with a compound containing SO$_3$M groups, or
   b) is reacted with a compound containing a functional group and the functional group itself is converted into an SO$_3$M group, or
   c) is reacted with a compound containing a functional group and the silica sol derivatized in this manner is further reacted with a compound containing SO$_3$M groups,
   the reaction is carried out in an aqueous medium having a water content of at least 75% by weight in at least one of the stages a), b), or c), based on the mass of the respective reaction mixture.

3. The process as claimed in claim 2, wherein according to b) the silica sol is reacted with mercapto compounds and the mercapto compound obtained is oxidized.

4. A paper characterized in that it contains a silica sol as claimed in claim 1.

5. The silica sol as claimed in claim 1, having a mean particle size, measured according to TEM, of 2-20 nm.

6. The process as claimed in claim 2, wherein according to b) the silica sol is reacted with mercapto compounds and the mercapto compound obtained is oxidized.

7. A silica sol containing sulfonic acid groups having a sulfur content, based on SiO$_2$ of the silica sol, of from 0.1 to 30 mol %, wherein the silica sol having a mean particle size, measured according to TEM, of 2-45 nm are those, which have bonded to a silicon atom, of formula (I):

—B—(SO$_3$M$_p$-),                           Formula (I)

wherein p is 1; M is hydrogen, an alkali metal, an alkaline earth metal, or ammonium; B is a linear or branched alkylene group optionally interrupted by one or more oxygen atoms and having 1 to 15 C atoms or a cycloalkylene group having 5 to 8 C atoms or a unit of formulae:

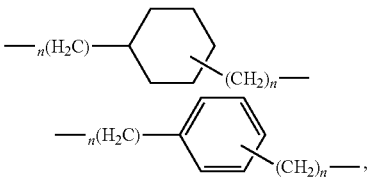

wherein n is 0 to 6.

8. The silica sol as claimed in claim 7, characterized in that it has a radical of the formula —(CH$_2$)$_3$—SO$_3$M, in which M is H, an alkali metal, an alkaline earth metal or ammonium.

9. A process for the preparation of the silica sols according to claim 7, characterized in that a silica sol which is free of SO$_3$M groups and in which M has the above meaning,
   a) is reacted with a compound containing SO$_3$M groups, or
   b) is reacted with a compound containing a functional group and the functional group itself is converted into an SO$_3$M group, or
   c) is reacted with a compound containing a functional group and the silica sol derivatized in this manner is further reacted with a compound containing SO$_3$M groups,
   the reaction is carried out in an aqueous medium having a water content of at least 75% by weight in at least one of the stages a), b), or c), based on the mass of the respective reaction mixture.

10. The process as claimed in claim 9, wherein according to b) the silica sol is reacted with mercapto compounds and the mercapto compound obtained is oxidized.

11. A paper characterized in that it contains a silica sol as claimed in claim 7.

12. The silica sol as claimed in claim 7, having a sulfur content, based on SiO$_2$ of the silica sol, of from 0.1 to 8 mol %.

13. The silica sol as claimed in claim 12, having a sulfur content, based on SiO$_2$ of the silica sol, of from 1 to 5 mol %.

* * * * *